Jan. 8, 1957 W. J. LABER ET AL 2,776,770
BALANCED SANITATION TRUCK
Filed May 18, 1955 3 Sheets-Sheet 1
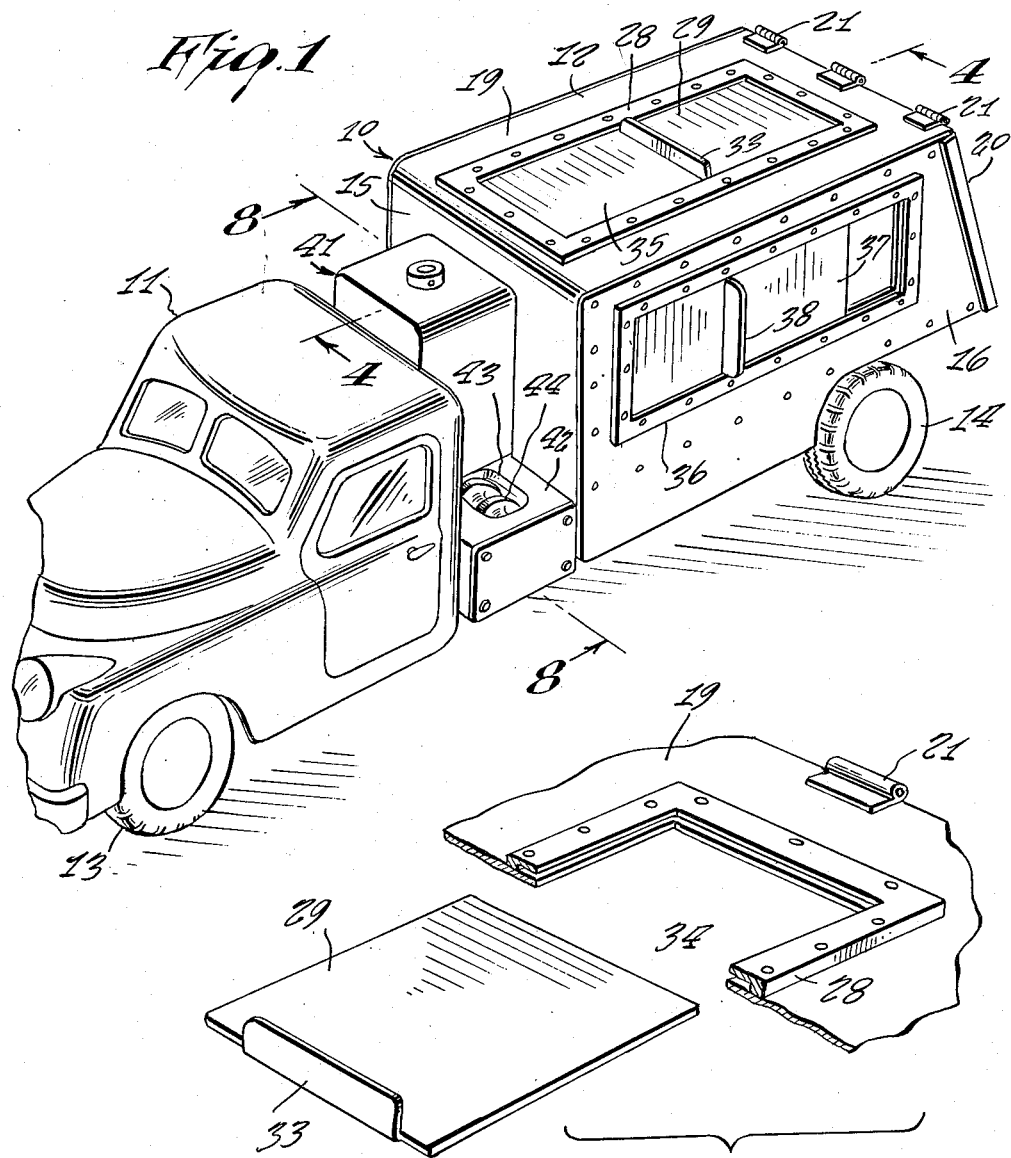
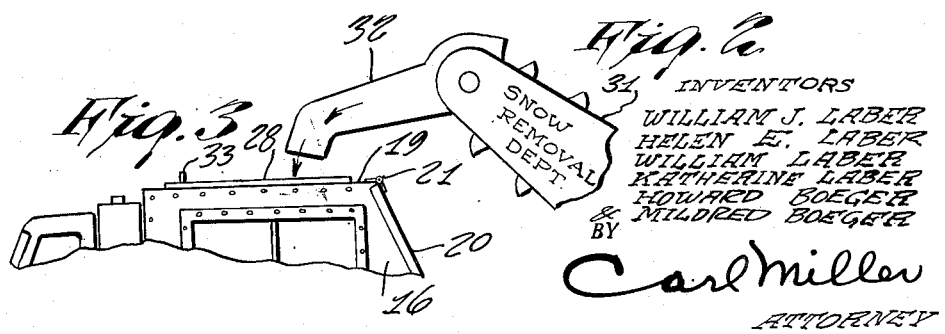
INVENTORS
WILLIAM J. LABER
HELEN E. LABER
WILLIAM LABER
KATHERINE LABER
HOWARD BOEGER
& MILDRED BOEGER
BY
Carl Miller
ATTORNEY

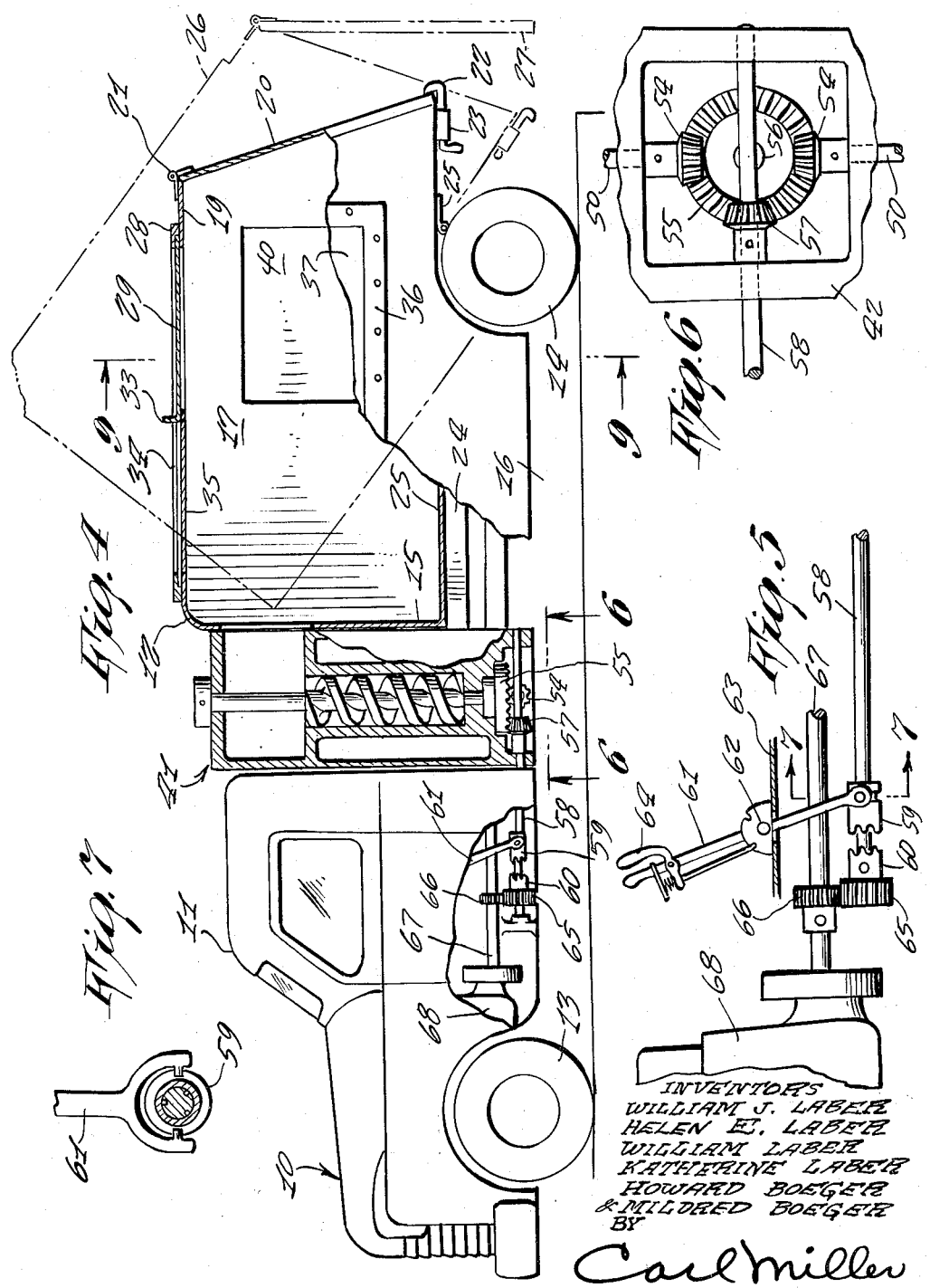

Jan. 8, 1957 W. J. LABER ET AL 2,776,770
BALANCED SANITATION TRUCK
Filed May 18, 1955 3 Sheets-Sheet 3
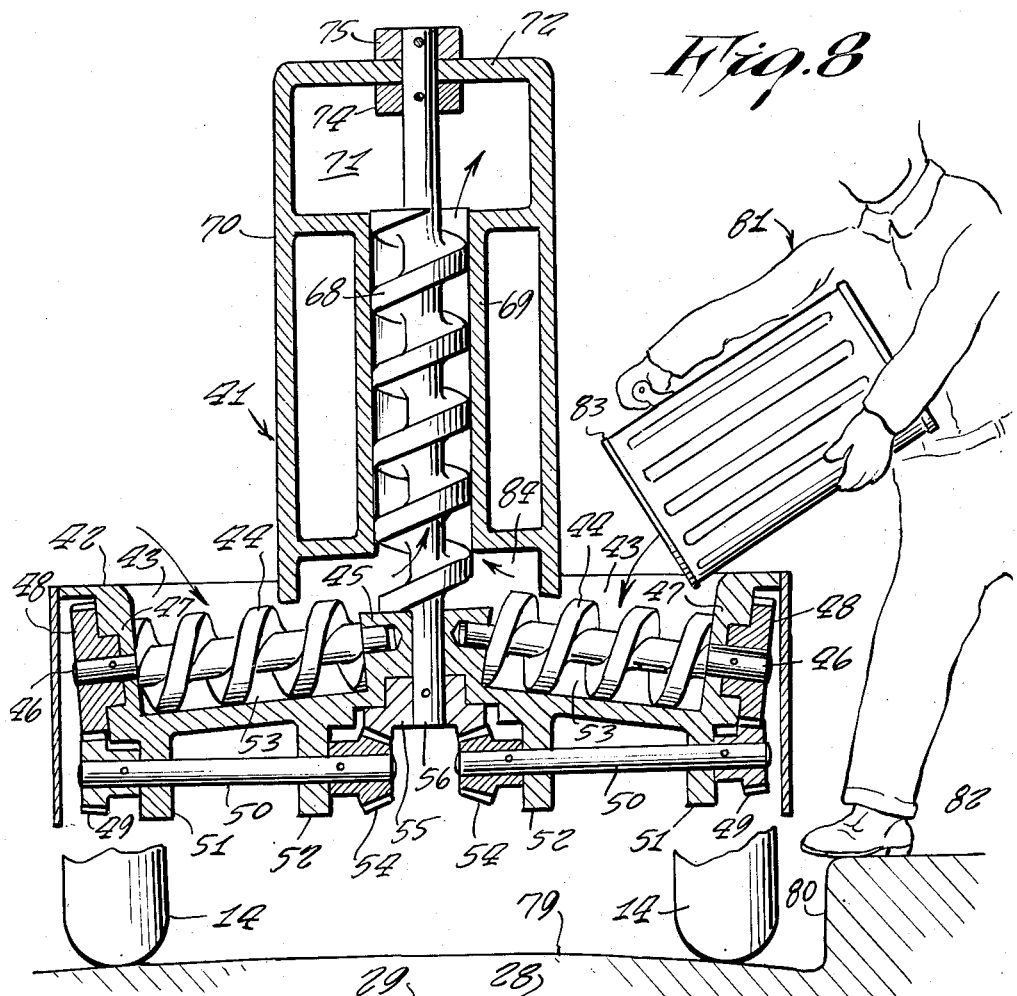
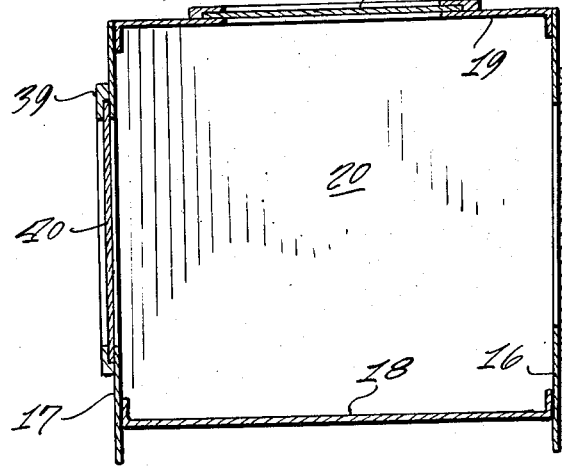
INVENTORS
WILLIAM J. LABER
HELEN E. LABER
WILLIAM LABER
KATHERINE LABER
HOWARD BOEGER
& MILDRED BOEGER
BY
Carl Miller
ATTORNEY

United States Patent Office 2,776,770
Patented Jan. 8, 1957

2,776,770

BALANCED SANITATION TRUCK

William J. Laber, Helen E. Laber, William Laber, and Katherine Laber, Baldwin, and Howard Boeger and Mildred Boeger, Wantagh, N. Y.

Application May 18, 1955, Serial No. 509,258

6 Claims. (Cl. 214—519)

This invention relates to collecting and disposal trucks for collecting and disposing of trash, garbage and refuse generally, and more specifically to a balanced sanitation truck.

The main object of our invention is to provide a special sanitation truck that has facilities for receiving rubbish and garbage in accessible position and for introducing the same into the truck without upsetting the balance of the truck as a whole.

An ancillary object of the invention is to provide means for receiving garbage and waste at the sides of the truck from the sidewalks instead of out in the gutter of a street.

Another object of this invention is to have such a truck that has garbage and waste receiving facilities at both sides thereof instead of at the rear as is usual on sanitation trucks generally.

A further object is also to have such a sanitation truck provided with waste and garbage distribution means that prevent overloading the rear and thereby overbalancing the rear end of the truck.

It is, of course a practical object withal, to have the mentioned type of truck provided with garbage receiving and distributing means that are extremely simple in construction and operation so as to operate readily and not be likely to break down or go out of commission.

It is even an object of this invention to so reconstruct in design, a sanitation truck that in operation, use, form, and actual driving, it is at all times well balanced and safe to operate and safe for the men operating and riding it.

An additional object is to have the truck of the invention provided with its operative mechanism between the truck body and the cab of the truck so as to reduce maintenance costs, not to mention that accidents are to be avoided because the location of the mechanism is such as to render it easy for the driver to see the men loading the truck at the sides thereof.

It should even be mentioned that further practical objects of the invention are to have the loading mechanism lower than that of contemporary devices on conventional trucks, and to have this mechanism so located as already intimated, that the body of the truck is left free for snow removal because the mechanism is unobtrusively disposed so as to avoid all interference with such snow removal.

Other objects and advantages of our invention will appear in greater detail as the specification proceeds.

In order to facilitate ready comprehension of this invention for a proper appreciation of the salient features thereof, the invention is illustrated on the accompanying drawings forming part hereof, and in which:

Figure 1 is a perspective view of a balanced sanitation truck made according to our invention and embodying the same in a practical form;

Figure 2 is a fragmentary exploded view of the top slide door structure found on the top as well as at the sides of the truck of Figure 1;

Figure 3 is a fragmentary side elevation of the upper part of the truck and a co-operating portion of snow removal and loading apparatus used when the truck serves for snow removal;

Figure 4 is a side elevation of the same truck of Figure 1, partly in section to disclose details of construction and operation;

Figure 5 is a fragmentary view of manually operated control mechanism for the garbage loading mechanism of the truck;

Figure 6 is a fragmentary bottom elevation of the loading mechanism as seen from line 6—6 in Figure 4;

Figure 7 is a transverse section taken on line 7—7 in Figure 5 of the manual control mechanism;

Figure 8 is a vertical transverse section of the truck as taken on line 8—8 in Figure 1; and Figure 9 is also a transverse vertical section of the truck body as taken on line 9—9 in Figure 4.

Throughout the views, the same or like parts are indicated by the same reference numerals.

Garbage disposal and sanitation trucks are common and unavoidable sights on our city streets because of their clumsy design and large size, which all too often tend to obstruct traffic and cause noisy commotion because of their rattling loading mechanism and rear garbage elevating and loading mechanism that occupy considerable space and vibrate their clattering way through our streets. Their dangerous character is also evident from the traffic problems produced and because the truck driver cannot readily see the men loading the truck at the rear. In fact, while disposal trucks of some character must be available, those in use have several serious disadvantages, yet they are so sorely needed that their disadvantages are overlooked as necessary evils that must be tolerated.

Upon considering this problem, it has occurred to us that a garbage disposal truck should first of all be safe and convenient to use, and should not only be cheaper to maintain than current sanitation trucks, but also be simple in construction and operation, as well as well balanced for ultimate safe dumping of the load. Such a truck should likewise preferably be readily available at a moment's notice as a snow removal truck, and have the interior entirely clear and available for receiving a load of garbage or of snow. As a result of such considerations, we have succeeded in producing a garbage disposal or balanced sanitation truck avoiding all foregoing disadvantages and instead embodying the objects and advantages already outlined; as will now be set forth in detail in the following.

Hence, in the practice of our invention, and referring also again to the drawings, a balanced sanitation truck, generally indicated at 10, primarily includes a truck cab 11, a truck body 12 supported by wheels 13, 14, etc., and naturally provided with motive means for propelling the truck and steering it (not shown). The body is formed of a front panel 15, opposite side walls 16 and 17, a bottom 18 and a top 19, while a rear door 20 is hinged to the top by hinges 21, 21, etc., and the door normally held closed by a manually swivelled latch 22 extending from latch housing 23 secured to the bottom 18 at its rear. Upon the frame of the truck 24 is a hinge 25 attached beneath the rear portion of bottom 18 and allowing the whole body to be rocked rearwardly for dumping the load as indicated by the broken lines at 26, the latch being of course released in order to facilitate complete emptying of the truck body, by allowing door 20 to swing free as indicated at 27.

Upon the top 19, a large open area is bounded by a frame 28 having a slot (Figure 2) in which a slidable top panel or door 29 is located and movable to the front of the truck body to expose opening 30. This is desirable for several purposes, among them that of receiving snow from a snow conveyor 31 when its spout 32 is directly above the opening in the truck top 19. The door 29 has an upwardly projecting flange 33 serving as a handle by which to shift this top door forwardly to open and rearwardly to close it. The mentioned slot 34 is, of course, sufficiently generous to allow free movement of the top door by hand at any time. Another door panel 35 is also slidable in frame 28 toward the rear when the top is for some reason to be opened toward the front.

In similar manner, the side wall 16 has a slotted frame 36 in which a sliding side door 37 with a handle flange 38 is located for opening this side of the truck body when desired. Likewise, the other side wall 17 has a similar slotted frame 39 with a sliding side door 40 (Figure 9). Details of the top and side doors are of less consequence, and are merely illustrative of a wide latitude of simple construction possible in connection with our invention, inasmuch as no part of any loading mechanism extends into the truck body, but simply communicates with it, as will now be set forth.

Thus, between the cab 11 and body 12 is mounted a loading device or mechanism, generally indicated at 41 consisting mainly of a generally horizontal frame 42 having two upward openings 43, 43 and a pair of oppositely disposed feed worms 44, 44 having their inner ends rotatably supported in bearings 45, 45 and their outer ends 46, 46 supported in bearings 47, 47 and provided with gears 48, 48 that in turn mesh with a pair of outer end gears 49, 49 fixed on the ends of two opposite transfer shafts 50, 50 supported in bearings 51, 51, 52, 52 forming parts of frame 42. The feed worms operate in troughs 53, 53 accessible through the mentioned upper openings 43, 43 that serve to receive waste and garbage and allow the same to drop into the trough about the feed worms.

Upon the inner ends of shafts 50, 50 are fixed bevel gears 54, 54 meshing with a larger gear 55 fixed on the lower end of an upright shaft 56 having an upwardly extending feed worm forming an elevator for the garbage and waste received by the worms 44 as will be explained. The larger gear 55 meshes with a driven gear on a power driven shaft at 57, this power shaft 58 having a clutch ensemble 59, 60 operable by a manual lever 61 pivoted at 62 on the cab frame 63 controlled by handle 64. The power shaft 58 has a gear 65 meshing with a drive gear 66 fixed on the transmission shaft 67 extending from the engine 68. The main shaft 67 thus drives the worms 44 when the clutch 59, 60 is engaged.

The mentioned upright shaft 56 is but the lower end of the upright elevator worm 68 rotatably mounted in an upright hollow cylindrical portion 69 in an upright section 70 of the loading mechanism that has an upper transfer chamber 71 immediately above the upper end of the elevator worm. The top 72 of the mentioned upright section 70 forms a bearing for the upper end shaft 73 of the elevator worm and carries two collars 74, 75 to maintain the worm at a predetermined level at all times. Transfer chamber 71 has a rear opening 76 through which contents brought up into the same overflow into the interior of truck body and thereby fill it from the front of the latter through front wall 15 thereof.

If for any reason access is desired to the gears 48, 49 at the sides, the side plates 77 held by screws 78, 78 may be temporarily removed and the gears and their shafts and bearings lubricated. The arrangement is such, that when the truck is stopped in the street 79 adjacent to the curb 80, the man 81 may stand with his feet upon the sidewalk 82 and empty a garbage can 83 into the side opening 43 and thereby cause the feed worm 44 to shift this waste inwardly to a chamber 84 at the bottom of the elevator worm, where the latter elevates the garbage from chamber 84 up into transfer chamber 71, whence the garbage will pass into the truck body 10 through rear opening 76 and opening 85 in the front wall 15 of this truck body.

Naturally, when such a loading operation is to be performed, the driver in the truck cab 11 manipulates the handle 64 of lever 61 and brings clutch members 59 and 60 into mutual engagement so that engine drive shaft 67 drives shaft 58 and through gearing 48, 49, 54, 55, 57, 65 and 66 causes both lower feed worms 44 and elevator worm 68 to operate simultaneously and shift all garbage from the troughs 53, 53 at either or both sides to the chamber 84 and thence to upper chamber 71 and finally into the truck body. When the latter is sufficiently loaded, and the truck driven to the intended location the latch 22 is released and the body tilted rearwardly on hinge 25 into the position indicated at 26 and the load dumped. When the body is again set back on its frame 24 and rear door 20 closed, this door may again be locked by swivelling latch 22 into place to hold it.

It is evident that the truck may be loaded at either side in convenient manner and in full view of the driver of the truck and that this truck will be more compact than conventional disposal trucks and also more reasonable to maintain, as there are few parts and they are simply rotary members without chains or conveyors and the like that easily go out of commission.

Manifestly, variations may be resorted to, and parts and features may be modified or used without others within the scope of the appended claims.

Having now fully described our invention, we claim:

1. A truck loading device for a truck having a driven shaft and a cab together with a truck body for receiving a load of garbage or waste, said device including a frame located between the cab and truck body, the latter having a front opening in the front wall thereof, a trough in either side of the frame having an upward opening for receiving garbage, a feed worm rotatably mounted in the frame and occupying the lower portion of the trough, the frame having a gear driven from said driven shaft and an upright cylindrical portion above said gear, an upright elevator worm in said cylindrical portion connected to said gear, and means for driving the feed worm in either side of said frame including a further gear connected to the worm at each side and meshing with the first mentioned gear, each said feed worm being inclined upwardly towards said elevator worm and defining an acute angle between the lower end of said elevator worm and said respective feed worms.

2. A truck loading device for a truck having a driven shaft and a cab together with a truck body for receiving a load of garbage or waste, said device including a frame located between the cab and truck body, the latter having a front opening in the front wall thereof, a trough in either side of the frame having an upward opening for receiving garbage, a feed worm rotatably mounted in the frame and occupying the lower portion of the trough, the frame having a gear driven from said driven shaft and an upright cylindrical portion above said gear, an upright elevator worm in said cylindrical portion connected to said gear, means for driving the feed worm in either side of said frame including a further gear connected to the worm at each side meshing with the first mentioned gear, and a transfer chamber disposed in said upright cylindrical portion of said frame above said elevator worm having a rear opening, said rear opening in said transfer chamber normally being registered with said front opening in said front wall of said truck body.

3. A truck loading device according to claim 2, wherein a pair of shafts are located adjacent to the feed worms and have two gears upon each shaft with one gear of each shaft meshing directly with the first mentioned gear and the other gear of each shaft meshing with the gear connected to each feed worm.

4. A self loading truck including a truck cab, a truck body having a front opening in the front wall thereof, and a loading device located between the cab and truck body with a truck frame interconnecting the cab, loading device and truck body unto a unit, a loading frame forming a part of the loading device extending transversely to both sides of the truck and having upward openings accessible from the sides thereof, one of a pair of feeding worms rotatably disposed beneath each said openings, a transfer chamber above the level of these worms, an upright elevator worm rotatably located within the frame in effective position to receive garbage from said feeding worms and elevate the garbage into position adjacent to said front opening in the front wall of the truck body, said feeding worms being inclined upwardly towards said elevator worm, and means for simultaneously rotating all of said worms to bring the garbage from the openings at the sides of the loading frame through the front opening and into said truck body.

5. A self loading truck according to claim 4, wherein the truck has a driven shaft carrying a driven gear and the loading frame having a main gear connected to the elevating worm meshing with the driven gear, and the frame also having a pair of shafts with gears at both ends with one gear on each shaft meshing with the main gear, and wherein the two feed worms each have a gear meshing with the other gear on each adjacent shaft, so that all worms will rotate upon rotation of the driven gear by said driven shaft.

6. A self loading truck according to claim 4, wherein the loading frame has a chamber at the bottom of the elevator worm for receiving the garbage from the inner ends of the feed worms and the transfer chamber is disposed above the upper end of the elevator worm, and wherein said loading frame has an upwardly extending cylindrical portion in which the elevator worm is rotatably mounted.

References Cited in the file of this patent

UNITED STATES PATENTS

| | | |
|---|---|---|
| 1,744,595 | Turner | Jan. 21, 1930 |
| 1,820,698 | Goodman | Aug. 25, 1931 |
| 2,166,846 | McCalley | July 18, 1939 |
| 2,646,736 | Swartout | July 28, 1953 |

FOREIGN PATENTS

| | | |
|---|---|---|
| 746,053 | France | Feb. 27, 1933 |